United States Patent
Chan et al.

(10) Patent No.: US 8,272,189 B2
(45) Date of Patent: Sep. 25, 2012

(54) PV MODULE FRAME, PV MODULE AND INSTALLATION SYSTEM THEREOF

(75) Inventors: Palvin Chan, San Francisco, CA (US); Wang Yu, Jiangsu (CN); Matthew LeDucq, San Francisco, CA (US); Andrew Beebe, Burlingame, CA (US); Joseph Benga, San Francisco, CA (US); Jacob Steele, San Francisco, CA (US); Johann Niehaus, Dripping Springs, TX (US)

(73) Assignee: Wuxi Suntech Power Co., Ltd., Jiangsu (CN)

( * ) Notice: Subject to any disclaimer, the term of this patent is extended or adjusted under 35 U.S.C. 154(b) by 177 days.

(21) Appl. No.: 12/549,905

(22) Filed: Aug. 28, 2009
(Under 37 CFR 1.47)

(65) Prior Publication Data
US 2010/0275974 A1    Nov. 4, 2010

(30) Foreign Application Priority Data
Apr. 29, 2009   (CN) .......................... 2009 1 0137269

(51) Int. Cl.
*E04C 2/38* (2006.01)
(52) U.S. Cl. .................................... 52/792.11; 52/173.3
(58) Field of Classification Search ................. 52/173.3, 52/792.11, 553, 542; 136/244, 251
See application file for complete search history.

(56) References Cited

U.S. PATENT DOCUMENTS

| | | | | |
|---|---|---|---|---|
| 3,127,960 A * | 4/1964 | Smith et al. | | 52/222 |
| 4,445,305 A * | 5/1984 | Orie, Sr. | | 52/309.9 |
| 5,974,758 A * | 11/1999 | Pielmeier | | 52/656.2 |
| 6,557,310 B2 * | 5/2003 | Marshall et al. | | 52/220.1 |
| 6,996,943 B2 * | 2/2006 | Denier et al. | | 52/220.7 |
| 7,297,866 B2 * | 11/2007 | Aschenbrenner | | 136/246 |
| 7,592,537 B1 * | 9/2009 | West | | 136/251 |
| 7,888,587 B2 * | 2/2011 | Shingleton et al. | | 136/246 |
| 7,956,279 B2 * | 6/2011 | Morita et al. | | 136/251 |
| 2006/0219291 A1 * | 10/2006 | Hikosaka et al. | | 136/251 |
| 2007/0131273 A1 * | 6/2007 | Kobayashi | | 136/251 |

FOREIGN PATENT DOCUMENTS

| JP | 2003056147 A | * | 2/2003 |
|---|---|---|---|
| JP | 2003096986 A | * | 4/2003 |
| JP | 2003336357 A | * | 11/2003 |

* cited by examiner

*Primary Examiner* — Christine T Cajilig
(74) *Attorney, Agent, or Firm* — Baker & Hostetler LLP

(57) ABSTRACT

A PV module frame, includes a module recess, a sidewall vertical to the module recess and a bottom portion vertical to the sidewall. The bottom portion extends from the bottom of the sidewall along the opposite direction of the recess of the module recess. A PV module having the PV module frame and a PV module installation system for installing the PV module onto a support, wherein the bottom portions of the adjacent solar cell assemblies are socket jointed and fixed to at least one installation beam which is fixed to the support. The beneficial effect of the present invention is that: fast installation of a PV module could be realized only by using the improved frame and one installation beam, Which reduces the quantity of the members in an installation system module and makes the installation more efficient, easier and more economical.

15 Claims, 9 Drawing Sheets

PRIOR ART

PV MODULE FRAME, PV MODULE AND INSTALLATION SYSTEM THEREOF

CROSS-REFERENCE TO RELATED APPLICATIONS

This application claims priority to Chinese patent application entitled "PV Module Frame, PV Module and Installation System Thereof," filed Apr. 29, 2009, having serial number 200910137269.3, now pending, the disclosure of which is hereby incorporated by reference in its entirety.

FIELD OF THE INVENTION

The present invention relates to the photovoltaic field, especially relates to a PV module frame and a PV module having said module frame, and further relates to an installation system for installing said PV module.

BACKGROUND OF THE INVENTION

Encapsulation is a crucial step in the PV module production. As an important step in encapsulation process, frame up plays a role of increasing the module strength, further sealing module and prolonging operating life of the module. To be more important, the PV module can be installed on other parts such as walls, roofs of buildings or the like by using the PV module frame installed around the PV module.

The invention patent possessed by this applicant under patent No. 200520140581.5 granted on Apr. 18, 2007 provides a large-scale PV module frame with adhesive agent accommodating slot as shown in FIG. 1, wherein an module recess 1' provided on the upper side of the frame includes an upper cavity portion 11', lower cavity portion 12' and a side portion 13'. The module recess 1' is formed as a wedge-shaped adhesive agent accommodating slot with the bottom thereof is larger than the notch thereof, in which a PV module 5' is placed. A sidewall 2' is provided on the left side of the frame and both end faces of the sidewall 2' are sealed. A bottom portion 3' provided on the lower side of the frame extends from the bottom of said sidewall 2' along the same direction of the recess of said module recess.

In the prior art, the installation of PV module is usually realized by vertical and horizontal sectional materials. Concretely speaking, vertical and horizontal sectional materials are fixed on walls, roofs of the building or the like and then are connected to the frames. By this way, the PV module is finally fixed on walls, roofs of the building or the like.

When implementing embodiments of the present invention, the inventors find at least the following problems existing in the prior arts: vertical and horizontal sectional materials fixed on the walls or roofs of the building or the like are necessary when a PV module is being installed. Besides, the connection structure between the frames and vertical and horizontal sectional materials is complicated, so that it takes more time and efforts to have the PV module installed and large quantity of parts of the whole PV module installation system are required.

SUMMARY OF THE INVENTION

The object of the present invention is to provide a PV module frame, a PV module and a PV module installation system so as to realize the fast installation of PV module and to reduce the quantity of parts of the PV module installation system.

In order to achieve the above-mentioned object, the present invention provides a PV module frame comprising an module recess, a sidewall vertical to the module recess and a bottom portion perpendicular to the sidewall, said bottom portion extending horizontally from the bottom of said sidewall along the opposite direction of the recess of said module recess.

Preferably, said PV module frame further includes a side portion extending upwards from the free end of the bottom portion along the direction vertical to the bottom portion.

The present invention further provides a PV module comprising solar cells and frames, each frame including an module recess, a side wall vertical to the module recess and a bottom portion perpendicular to the sidewall, wherein at least the bottom portions of frames at two opposing sides of said PV module extending from the bottom of the respective sidewall along the opposite direction of the recess of said module recess.

Preferably, the width of the bottom portion of frame of said one side is greater than that of a bottom portion of frame of said the other side.

Preferably, the frame(s) of said one side and/or said the other side include(s) side portion(s) extending upwards from the free end of bottom portion along the direction vertical to the bottom portion. Besides, the width of the bottom portion of frame of one side is greater than that of the bottom portion of frame of the other side so that the frame with a smaller width could be socket jointed to that with a greater width.

The present invention further provides a PV module installation system for installing said PV module onto a support, wherein the bottom portions of the adjacent solar cell assemblies are socket jointed and fixed to at least one installation beam which is fixed to said support.

Preferably, at least one of frames of the adjacent sides of said adjacent solar cell assemblies includes a side portion.

Preferably, said installation beam and said bottom portion are fixed through a fastener.

The present invention at least have the following beneficial effects: simple structure; small quantity of the installation parts; the installation of PV module could be realized only by using the structure-improved frames and an installation beam, which makes the installation quick, convenient, efficient and time-saving.

DETAILED DESCRIPTION ON THE EMBODIMENTS

Figure 2:
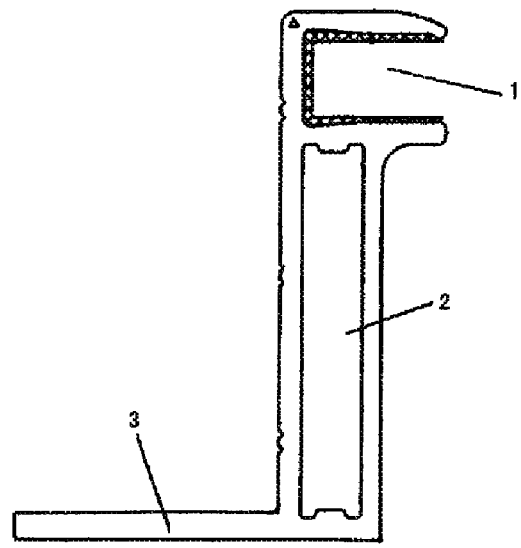
FIG. 2 is a cross-sectional view of the PV module frame of an embodiment of the present invention.

The accompanying drawings, which are included to provide a further understanding of the invention and are incorporated in and constitute a part of this specification, illustrate embodiments of the invention and, together with the description, serve to explain the principles of the invention, wherein:

FIG. 2 is a cross-sectional view of the PV module frame (hereinafter short for "frame") of an embodiment of the present invention. As shown in FIG. 2, the frame of the embodiment of the present invention comprises a module recess 1, a sidewall 2 vertical to the module recess 1 and a bottom portion 3 perpendicular to the sidewall 2. The module recess 1 is a wedge-shaped adhesive agent accommodating slot with the bottom thereof larger than the notch thereof. The bottom portion 3 extends horizontally from the bottom of the sidewall 2 along the opposite direction of recess of the module recess 1.

Figure 1:
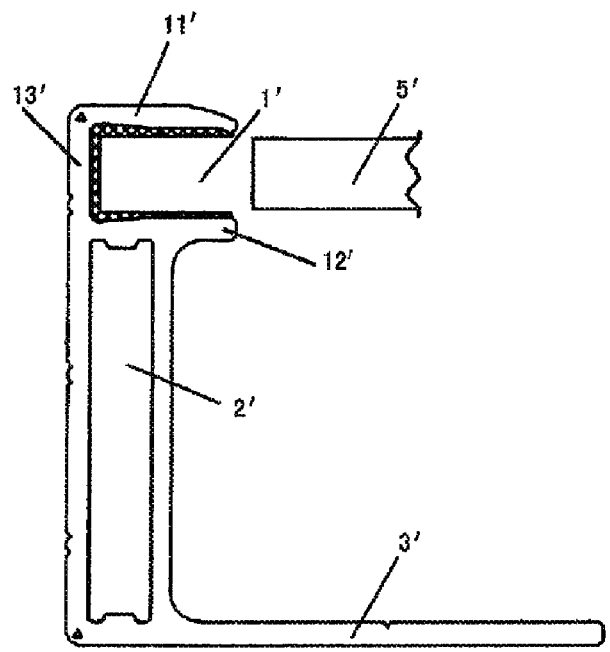
FIG. 1 is a cross-sectional view of the PV module frame in the prior art.

Comparing FIG. 2 with FIG. 1, the main improvement of the frame of the present invention with respect to the frame of the prior art is the extension direction of bottom portion 3. After adopting such a configuration, when the adjacent two solar cell assemblies are connected, the bottom portions 3 of the frames on the their adjacent sides could be socket jointed together, and thus be connected and fixed quickly through a fastener, which will make the connection not only between the adjacent frames (i.e. between the adjacent solar cell assemblies) but also between the frame and other part quick and simple.

Figure 3:
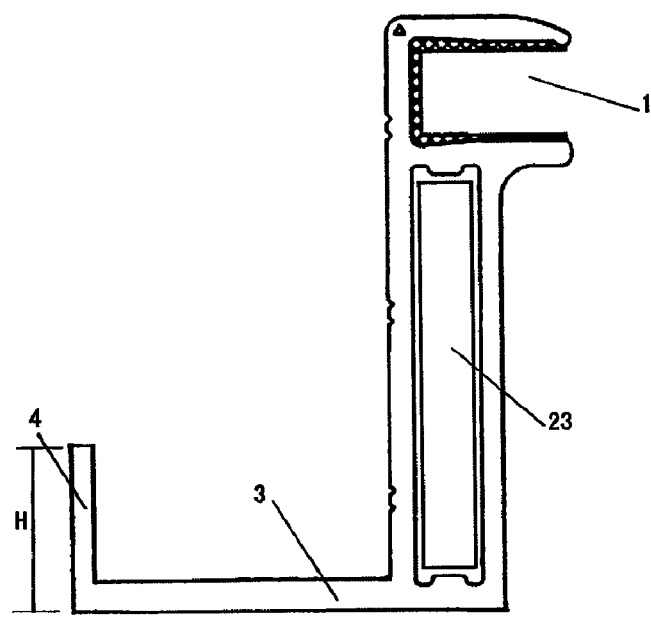
FIG. 3 is a cross-sectional view of the PV module frame of another embodiment of the present invention.

FIG. 3 is a cross-sectional view of the PV module frame of another embodiment of the present invention. As shown in FIG. 3, the frame may further includes a side portion 4 extending upwards from the free end of the bottom portion 3 along the direction vertical to the bottom portion 3. The height H of the side portion 4 is no greater than that of the side portion 2. The connection strength of the adjacent solar cell assemblies are increased and the module installation is more convenient with the aid of said side portion.

In the embodiments of the present invention, as shown in FIG. 3, the sidewall 2 is of a cavity structure in which the reinforcement plate 23 such as a steel plate is provided to strengthen bending strength of the sidewall 2. The reinforcement plate 23 is located in the middle of the sidewall 2 and connected closely with the inner wall of the cavity structure. Its length is no smaller than the width of the installation beam 8 described below, which could be selected according to the concrete practical environments and its installation strength needed. In addition, preferably, after the reinforcement plate 23 is provided into the cavity structure, the two ends of cavity structure are sealed with sealing materials to prevent the reinforcement plate 23 from the outside environment.

Figure 4:
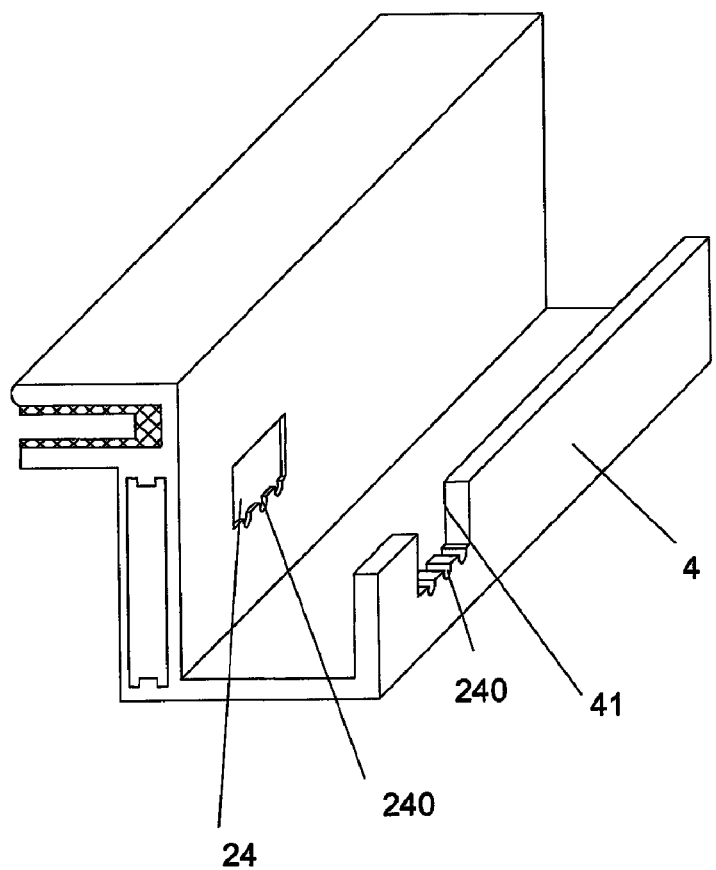
FIG. 4 is a perspective view of the PV module frame of another embodiment of the present invention.
Figure 5:
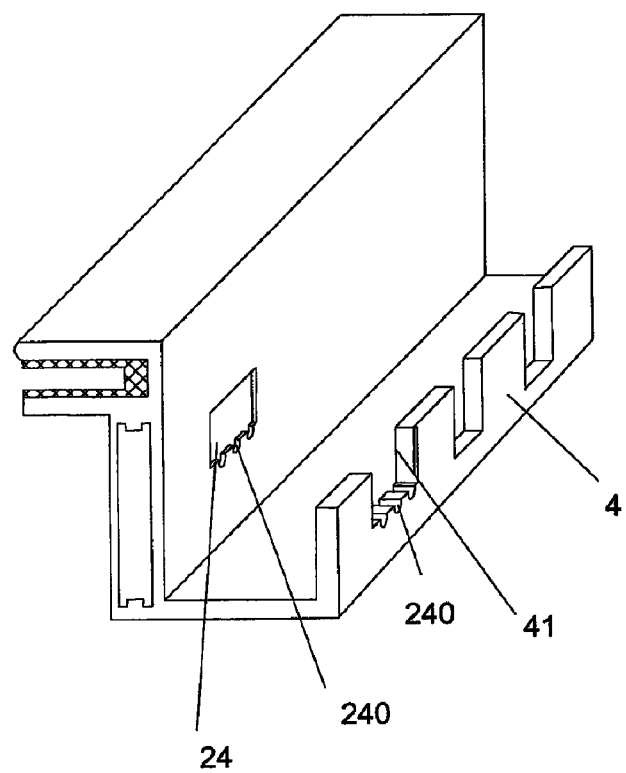
FIG. 5 is a perspective view of the PV module frame of a further embodiment of the present invention.

FIG. 4 is a perspective view of the PV module frame of another embodiment of the present invention. As shown in the drawing, an alignment hole 24 can be opened on the sidewall 2; an alignment slot 41 could be accordingly set on the side portion 4 for alignment, through which the power cord can be connected to the other solar cell assemblies. A power cord recess 240 (in order to simplify the views of FIG. 6 to FIG. 14, the power cord recess 240 is omitted) is provided on both the alignment hole 24 and the alignment slot 41. By doing so, the power cord alignment can be fixed, which not only saves space but also for a better appearance. FIG. 5 shows a perspective view of the PV module frame of a further embodiment of the present invention in which another structure of the side portion 4 is shown.

Figure 6:
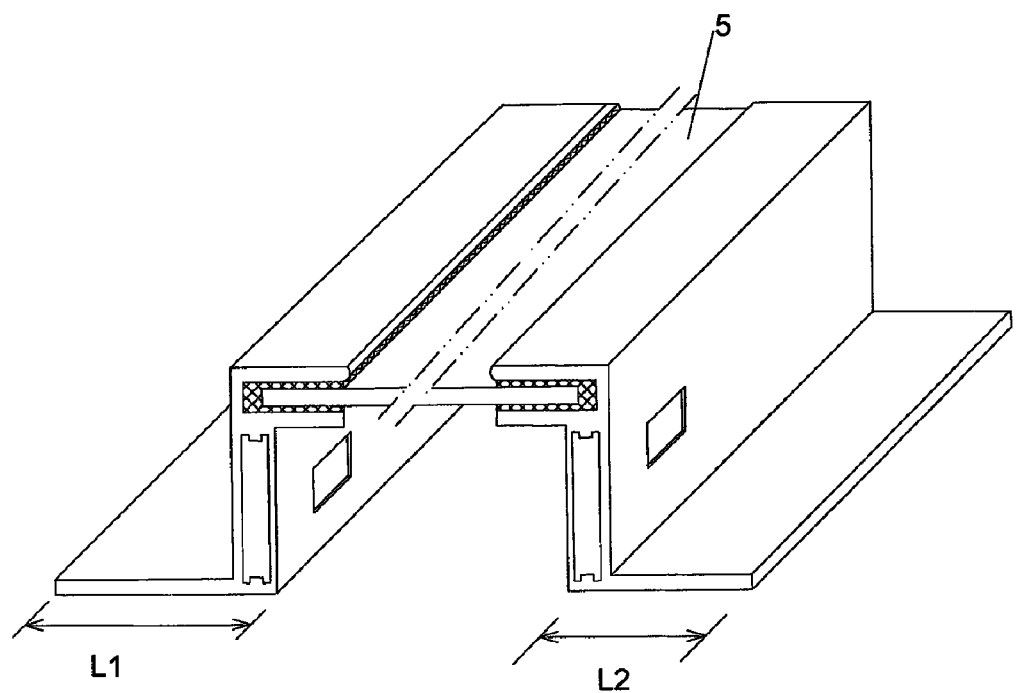
FIG. 6 is a perspective view of the PV module of an embodiment of the present invention.
Figure 7:
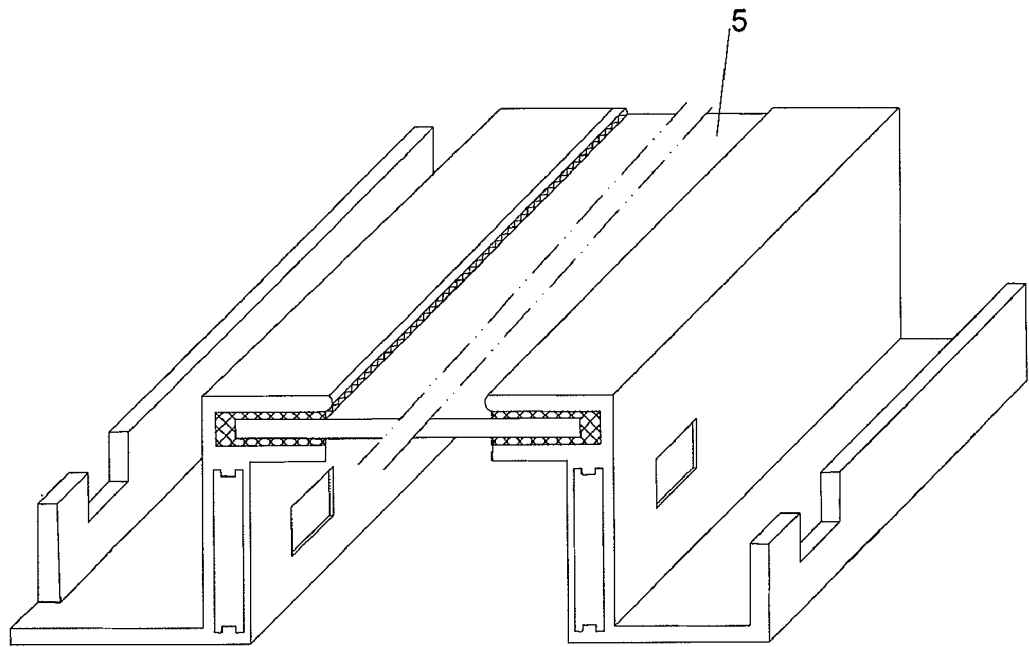
FIG. 7 is a perspective view of the PV module of another embodiment of the present invention.
Figure 8:
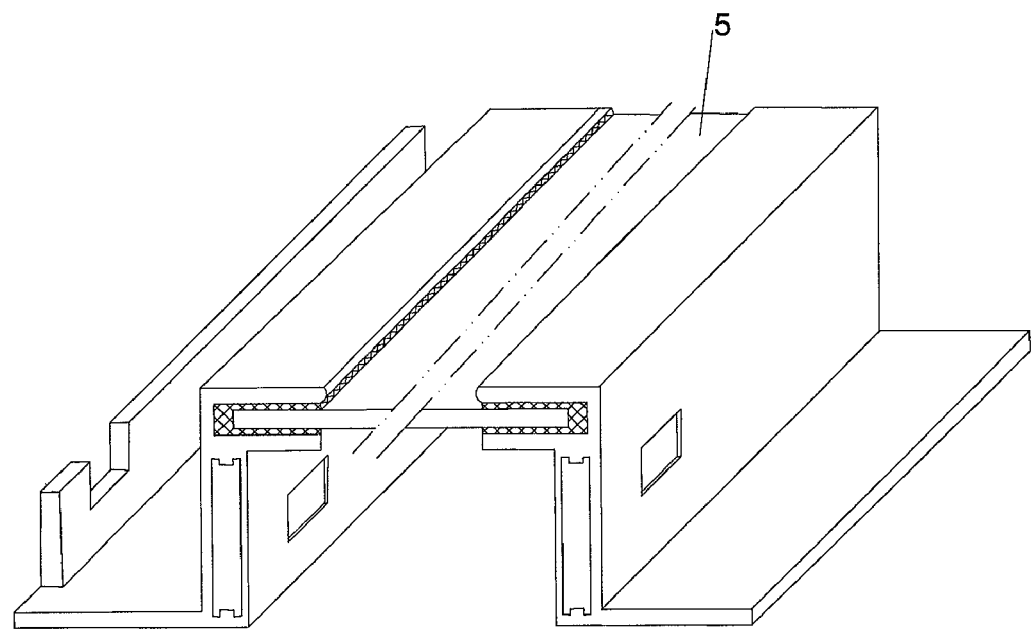
FIG. 8 is a perspective view of the PV module of a second embodiment of the present invention.

FIGS. 6-8 show the views of the PV module of embodiments of the present invention. The PV module 5 comprises the solar cells and frames. As shown in FIG. 6, the width L1 (i.e. the extended distance of the bottom portion from the bottom of its sidewall) of the bottom portion of the frame installed on one side of the PV module could be greater than the width L2 of the bottom portion of the frame installed on the other side opposite to said one side so that the frame with a smaller width could be socket jointed to the one with a greater width. FIG. 7 shows that both the frames of one side and the other side include side portions. FIG. 8 shows that only the frame of one side includes a side portion, wherein the width of bottom portion of frame of one side could be greater than that of the other side of the solar cell so that the frame with a smaller width could be socket jointed to that with a greater width. The PV module 5 shown in the drawing only shows the frames installed on the two opposite sides which are connected to the adjacent solar cell assemblies and the structure of the side portion in the drawing takes the structure of the side portion 4 shown in FIG. 4 as an example. However, it should be understood that frames can also be installed on the other two sides. Besides, according to the need of practical module installation, the frames of the other two sides could adopt the frame structures of the present invention or the frame structures of prior arts as shown in FIG. 1. When the frames on the other two sides adopt the frames structures of prior arts as shown in FIG. 1, among the frames shown in FIG. 7, the length of side portion of one side is smaller than that on the other side so that the frame with a smaller length could be socket jointed to the frame with a greater length of the adjacent PV module, i.e. to avoid interference between this side portion and the front and rear side frames of the adjacent solar cell assemblies.

Figure 9:
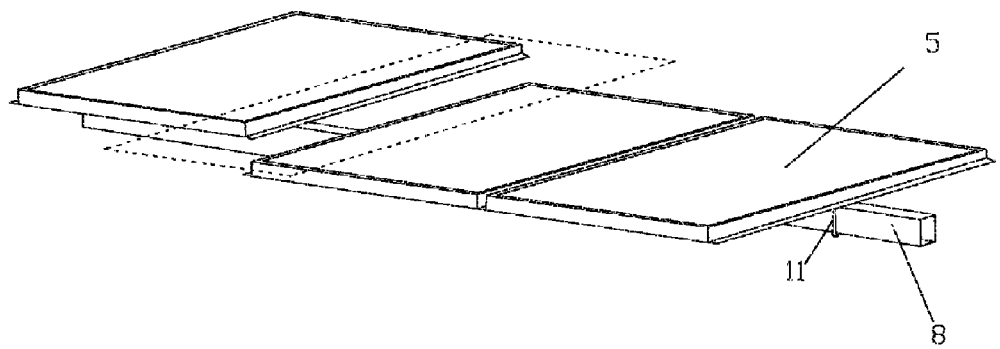
FIG. 9 is a perspective view of the PV module installation system of an embodiment of the present invention.

FIG. 9 shows the PV module installation system of an embodiment of the present invention. This system is used to install the PV module onto a support. This support can be fixed to the ground installation base or walls or roofs of the building or the like. As shown in the drawings, the bottom portions of the adjacent solar cell assemblies are socket jointed to each other and fixed on at least one installation beam 8. The bottom portions of two frames on the adjacent sides of the adjacent solar cell assemblies (i.e. the first frame 6 and the second frame 7) have different widths. The frame with a bottom portion of smaller width L2 is socket jointed to the one with a bottom portion of greater width L1 and then the module frames 6 and 7 are fixed and connected to the installation beam 8 by using the fastener such as a bolt. In order to make the orientation of the PV module and the installation beam 8 more accurate and faster, a fastener 11 such as a u-shaped bolt could be provided on the module frames, through which the installation beam 8 goes to achieve accurate orientation with the module. By doing so, the adjacent PV module could be quickly installed and grouped into one unity only by using the frames and an installation beam 8.

Figure 10:
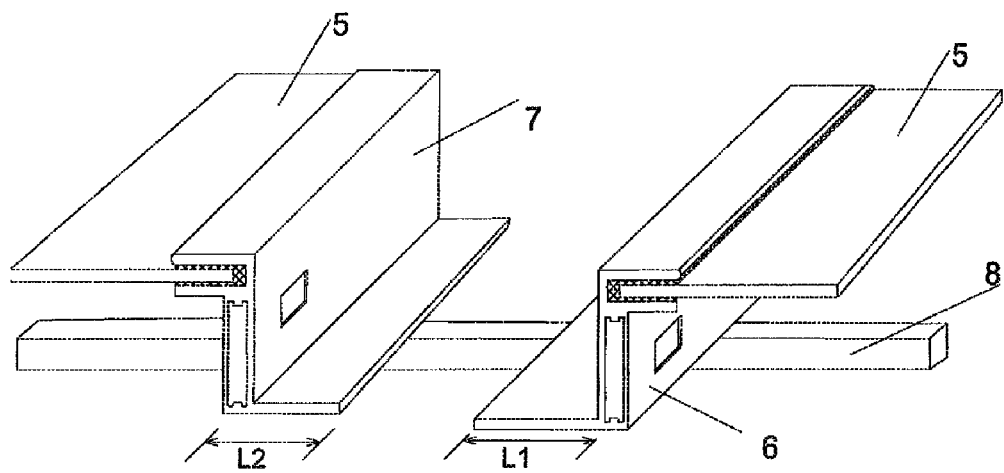
FIG. 10 is an enlarged view of the part enclosed by the broken lines.
Figure 11:
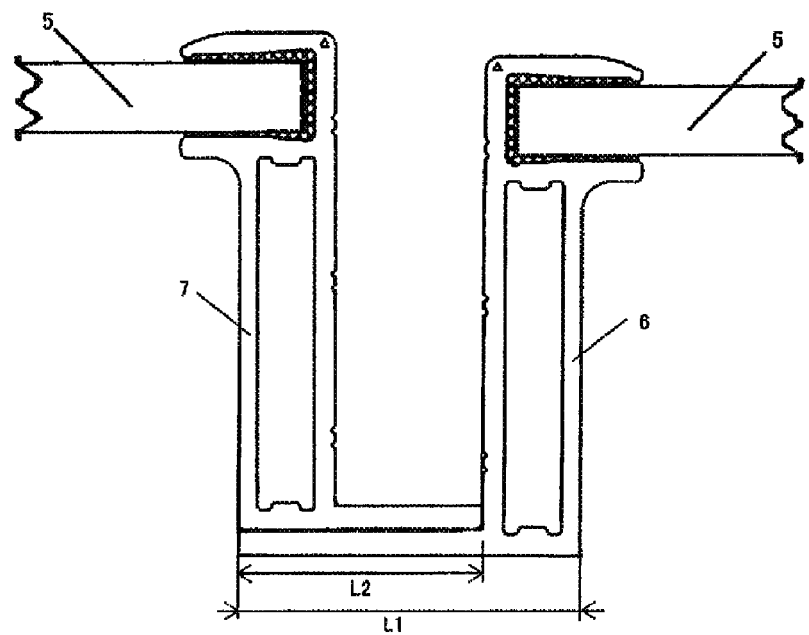
FIG. 11 is a cross-sectional view of the adjacent PV module frames in a socket joint state as shown in FIG. 10.
Figure 12:
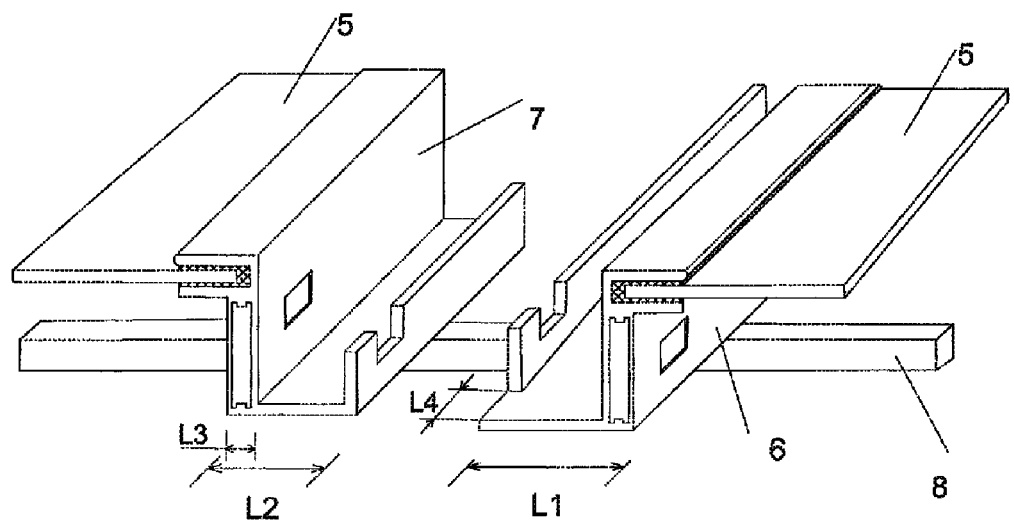
FIG. 12 is another enlarged view of the part enclosed by the broken lines in FIG. 9.
Figure 13:
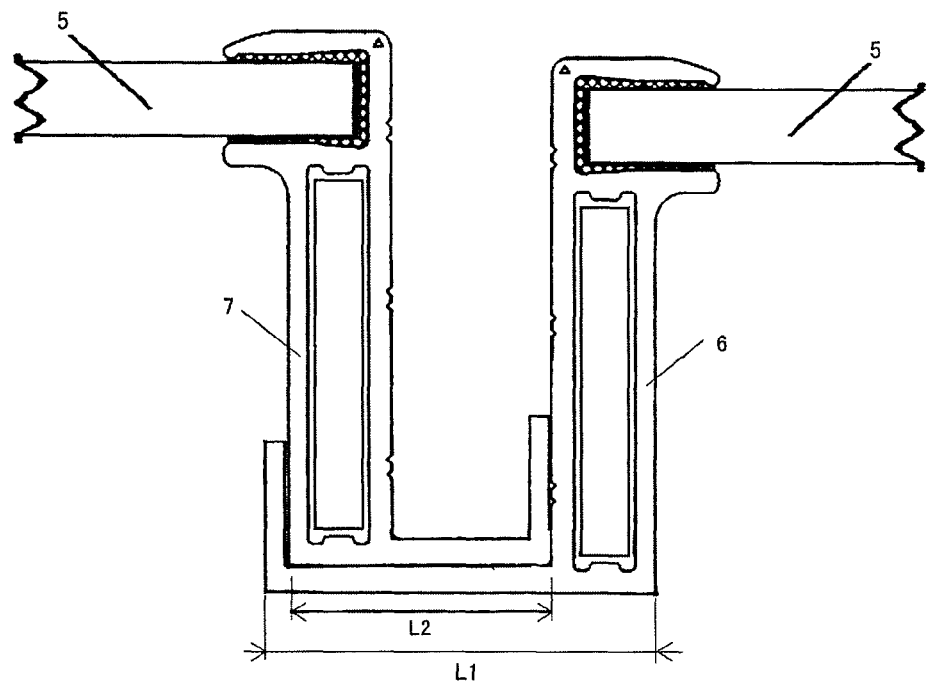
FIG. 13 is a cross-sectional view of the adjacent PV module frames in a socket joint state as shown in FIG. 12.
Figure 14:
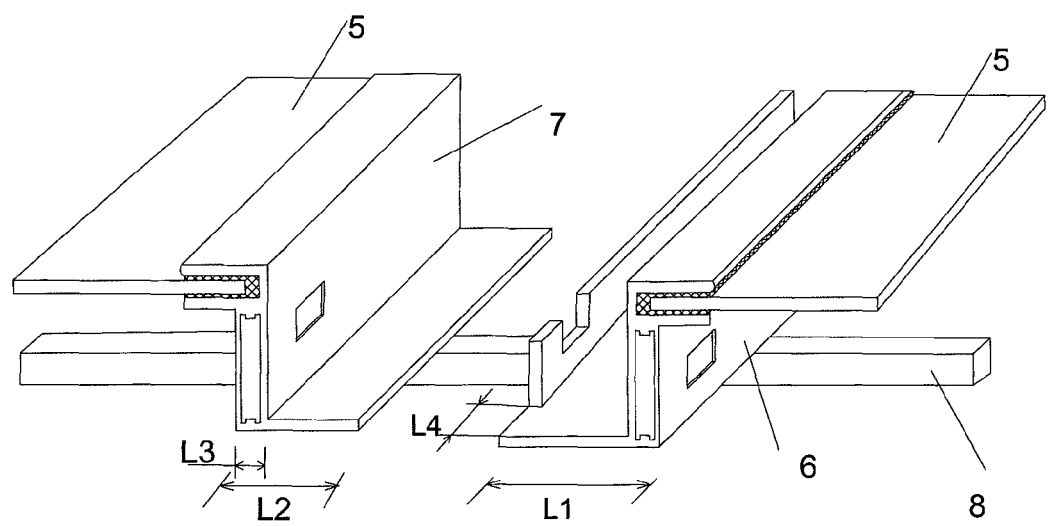
FIG. 14 is another enlarged view of the part enclosed by the broken lines in FIG. 9.
Figure 15:
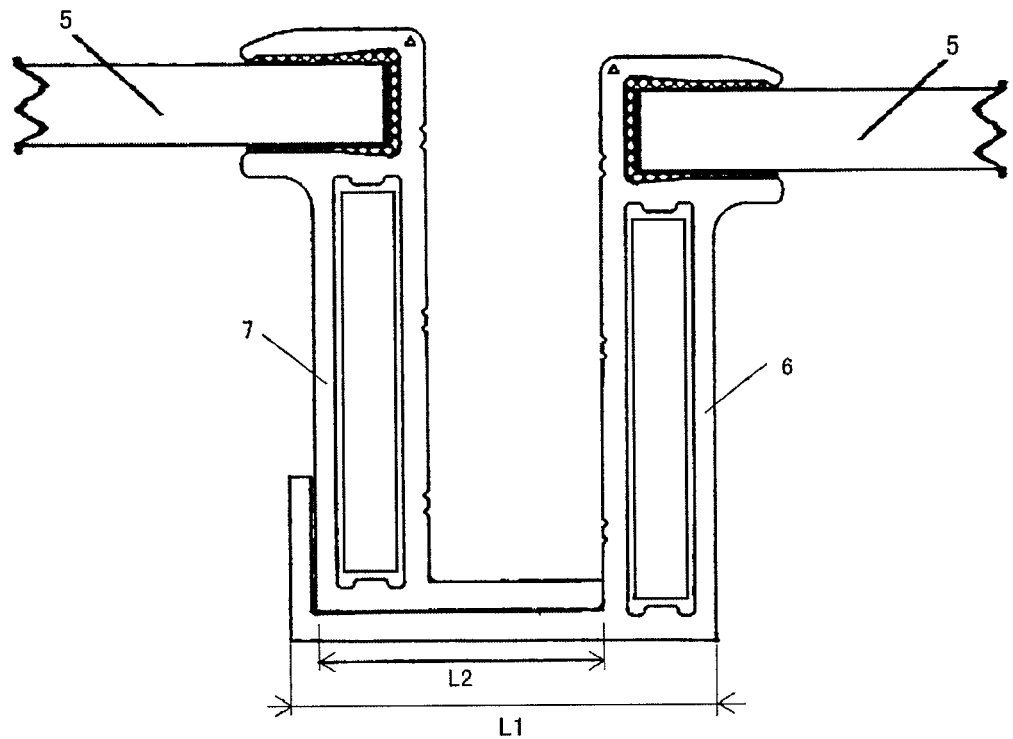
FIG. 15 is a cross-sectional view of the adjacent PV module frames in a socket joint state as shown in FIG. 14.

FIG. 10 is an enlarged view of the part enclosed by the broken lines in FIG. 9. For the purpose of clarity, only the first frame 6 and the second frame 7 on the adjacent sides of the adjacent solar cell assemblies are shown. The bottom portions of the first frame 6 and the second frame 7 are socket jointed as shown in FIG. 11. FIG. 12 is another enlarged view of the part enclosed by the broken lines in FIG. 9. In the case that the first frame 6 and the second frame 7 comprise the side portions, the first frame 6 and the second frame 7 could be socket jointed as shown in FIG. 13. At this time, the following structures could be adopted: suppose that the width of the bottom portion of the first frame 6 is L1, the width of the bottom portion of the first frame 7 is L2 and the thickness of the sidewall of the second frame 7 is L3, then the relationship L1-L2≧L3 is satisfied. In addition, the length of the side portion of the first frame 6 should ensure that the first frame 6 could be socket jointed to the second frame 7, that is to say, the inwardly-retracted distance L4 of the two ends of the side portions of the first frame 6 should be appropriate to avoid interference between this side portion and the front and rear side frames of the adjacent solar cell assemblies. FIG. 14 is a another enlarged view of the part enclosed by the broken lines in FIG. 9. At this time, the bottom portions of the first frame 6 and the second frame 7 could be socket jointed as shown in FIG. 15.

Figure 16:
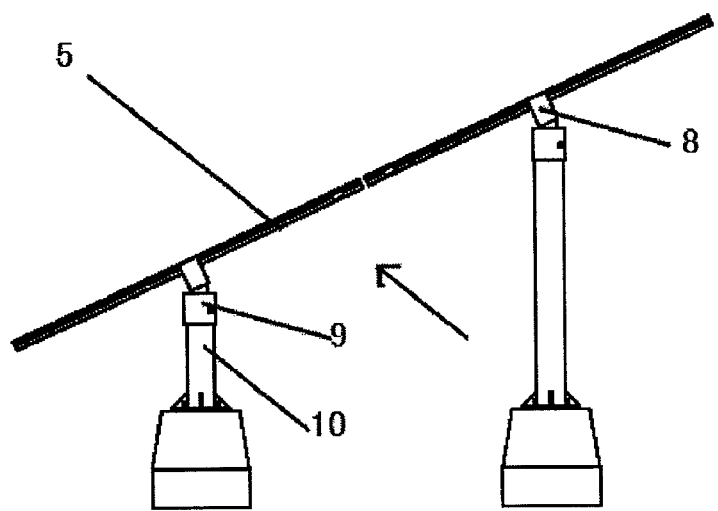
FIG. 16 is a side view showing the PV module installation system of an embodiment of the present invention and an upright post in a connection state.
Figure 17:
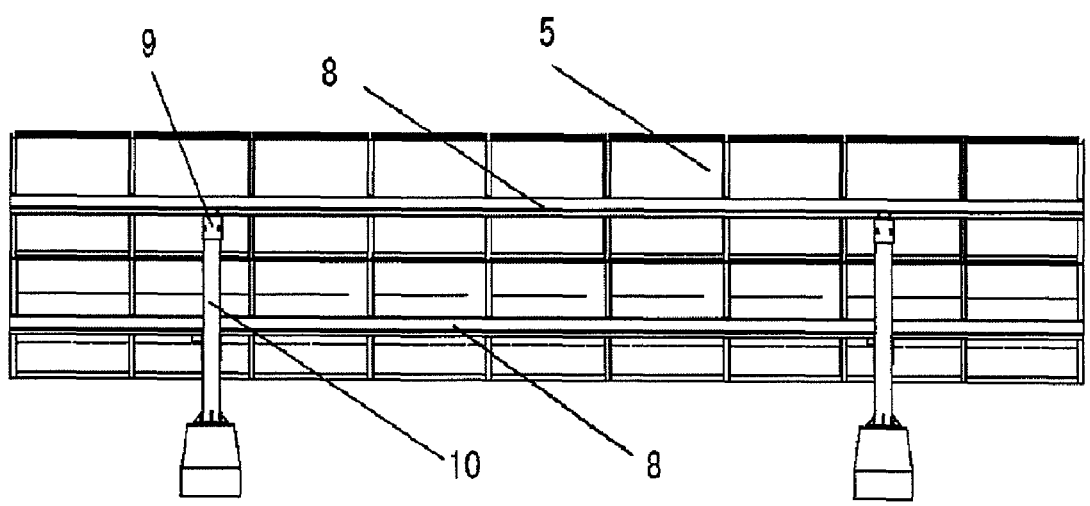
FIG. 17 is a rear view of the PV module installation system observed in the direction that the arrow indicates in FIG. 16.

FIGS. 16 and 17 are views that the PV module and the installation beam 8 are installed to the support after connected and fixed. FIG. 16 takes an upright post 10 as a support as an example to illuminate the situation of system installation. As shown in the drawings, in order to facilitate the adjustment of the installation angle between the PV module and the ground, the socket 9 is hinged to the bottom of the installation beam 8 of the PV module installation system in the embodiment of this present application, which is connected to the top of the upright post 10. In this situation, adjusting the orientation of the PV module according to the direction of sunlight could be realized.

Subsequently, a brief introduction of the installation steps of this installation system is provided as below:

Firstly, a row of solar cell assemblies are installed on the installation beam 8. Concretely speaking, the bottom portions of the first frame and the second frame on the adjacent sides of the adjacent PV module are socket jointed and then the socket jointed frames are fixed to the installation beam 8 by using a fastener such as a bolt to form a row of solar cell assemblies fixed on the installation beam 8 as shown in FIG. 9. The power cords of assemblies are connected to each other through the alignment hole and the alignment slot of the frames. In this situation, the installation of the PV module could be realized by only one installation beam 8. Of course, according to the sizes of module and need of installation strength, more installation beams could be provided or the width of the installation beam could be increased.

Subsequently, the installation beam 8 on which the PV module is fixed is connected to the support such as an upright post 10. As shown in FIG. 16, the socket 9 hinged to the installation beam 8 is connected to the top of the upright post 10. Since the support is fixed and connected with the ground installation base, the walls or roofs of the building or the like, the module could be fixed on the walls or roofs of the building or the like fast and conveniently by the aforesaid manner. According to actual needs of the installing capacity, multi-row solar cell assemblies can be formed. FIGS. 16 and 17 show two rows of installed assemblies. In this way, the PV module installation system suitable to a variety of practical occasions could be formed.

Besides, in the above-mentioned PV module installation system, when the sidewall of the module frame is of cavity structure, in order to ensure the bending strength of the installed module, the reinforcement plate can be provided in the cavity structure.

In addition, during the above-mentioned embodiments of the present invention, a stainless steel grounded plate of small volume could be provided on the back of the photovoltaic cell module, which is used to electronically connect the frame made of conductive materials such as aluminum with the installation beam 8 made of conductive materials such as steel. And then the grounded socket (e.g. made of tin-copper) connected with the grounded lead is provided on the installation beam 8. In this way, the security features of the installation system could be increased. Other known security structures are also available.

The present invention describes the structures of frames installed on the two opposite sides of the solar cell. It should be understood that it is available if only the frames on the adjacent sides of the adjacent solar cells fixed and connected to the installation beam adopt the frame structures as mentioned in the present invention while the frames of the other two sides make use of other structures. Besides, each feature published in the present invention could be assembled with one another.

With the above-mentioned installation system, the installation of the PV module could be realized only by the structure-improved frames and an installation beam. It can be seen that this installation system greatly simplifies the installation of the system structure, increases the speed of installation of the PV module and reduces costs of system installation.

It should be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A PV module frame for fast installing a PV module, comprising:
    a module recess;
    a sidewall vertical to the module recess;
    a bottom portion perpendicular to the sidewall, wherein said bottom portion extending from the bottom of said sidewall along an opposite direction of an opening of said module recess, and an alignment hole for a power cord is opened on said sidewall; and
    a side portion extending upwards from a free end of the bottom portion along a direction vertical to the bottom portion, wherein an alignment slot corresponding to the alignment hole is opened on the side portion.

2. The PV module frame according to claim 1, wherein said sidewall is of cavity structure.

3. The PV module frame according to claim 2, wherein a reinforcement plate for strengthening a bending strength of the sidewall is provided within said cavity structure.

4. The PV module frame according to claim 1, wherein a recess for the power cord is provided on said alignment hole.

5. The PV module frame according to claim 1, wherein a height of said side portion is less than or equal to a height of said sidewall.

6. The PV module frame according to claim 1, wherein recesses for the power cord are provided on said alignment hole and said alignment slot, respectively.

7. A PV module, comprising:
   a plurality of solar cells and frames, said frame comprising a module recess; and
   a sidewall vertical to the module recess and a bottom portion perpendicular to the sidewall, wherein the bottom portion of said frames of said PV module extending from a bottom of the respective sidewall along an opposite direction of an opening of said module recess, and the bottom portion of one frame defining an outmost face adapted to positionally abut against the sidewall of the adjacent frame, wherein an alignment hole for a power cord is opened on said sidewall and wherein a recess for the power cord is provided on said alignment hole.

8. The PV module frame according to claim 7, wherein the sidewalls are of cavity structure in which a reinforcement plate for strengthening bending strength of the sidewall is provided.

9. The PV module according to claim 7, wherein the width of the bottom portion of the frame is greater than that of the bottom portion of the adjacent frame.

10. The PV module according to claim 7, wherein the frames include a side portion extending upwards from a free end of the bottom portion along a direction vertical to the bottom portion, and furthermore, a width of the bottom portion of the frame is greater than that of the bottom portion of the adjacent frame so that the frame with a smaller width could be socket jointed to that with a greater width.

11. The PV module according to claim 10, wherein an alignment slot corresponding to the alignment hole is opened on said side portion.

12. The PV module according to claim 11, wherein recesses for the power cord are provided on said alignment hole and said alignment slot.

13. A PV module installation system for fast installing a PV module, comprising:
   a PV module, comprising:
      a plurality of solar cells and frames, said frame comprising a module recess; and
      a sidewall vertical to the module recess and a bottom portion perpendicular to the sidewall;
   wherein the bottom portion of said frames of said PV module extending from a bottom of the respective sidewall along an opposite direction of an opening of said module recess, and the bottom portion of one frame defining an outmost face adapted to positionally abut against the sidewall of the adjacent frame;
   wherein the sidewalls of said frames are of cavity structure in which a reinforcement plate for strengthening bending strength of the sidewall is provided;
   wherein an alignment hole for a power cord is opened on said sidewall and a recess for the power cord is provided on said alignment hole;
   wherein the width of the bottom portion of the frame of said one side is greater than that of the bottom portion of the adjacent frame; and
   wherein the PV module is on a support, and bottom portions of adjacent solar cell assemblies are socket jointed and fixed to at least one installation beam which is fixed to said support.

14. The PV module installation system according to claim 13, wherein at least one of frames of adjacent sides of said adjacent solar cell assemblies includes a side portion.

15. The PV module installation system according to claim 13, wherein said installation beam and said bottom portion are fixed by a fastener.

\* \* \* \* \*